United States Patent
Dewulf et al.

[19]

[11] Patent Number: 6,063,518
[45] Date of Patent: May 16, 2000

[54] SEALED ELECTROCHEMICAL CELL EQUIPPED WITH A CIRCUIT-BREAKING TERMINAL

[75] Inventors: Frédéric Dewulf, Poitiers; Norbert Gerin, Saint Benoit, both of France

[73] Assignee: Saft, Romainville, France

[21] Appl. No.: 09/101,964

[22] PCT Filed: Nov. 28, 1997

[86] PCT No.: PCT/FR97/02136

§ 371 Date: Jul. 21, 1998

§ 102(e) Date: Jul. 21, 1998

[87] PCT Pub. No.: WO98/24133

PCT Pub. Date: Jun. 4, 1998

[30] Foreign Application Priority Data

Nov. 28, 1996 [FR] France .................................. 96 14586

[51] Int. Cl.⁷ ..................................................... H01M 2/12
[52] U.S. Cl. ................................. 429/53; 429/54; 429/56; 429/61; 429/62
[58] Field of Search ................................. 429/53, 54, 56, 429/61, 62

[56] References Cited

U.S. PATENT DOCUMENTS

| | | | |
|---|---|---|---|
| 3,939,011 | 2/1976 | Zaleski . | |
| 5,523,178 | 6/1996 | Murakami et al. ........................ | 429/53 |
| 5,821,008 | 10/1998 | Harada et al. ............................. | 429/56 |
| 5,853,912 | 12/1998 | Naing et al. .............................. | 429/61 |
| 6,007,944 | 12/1999 | Bechtold et al. ........................ | 429/211 |

FOREIGN PATENT DOCUMENTS

WO9601504  1/1996  WIPO .

OTHER PUBLICATIONS

Patent Abstracts of Japan, vol. 095, No. 011, Dec. 26, 1995 corresponding to JP 07 226196 A (Sony Corp) Aug. 22, 1995.

Patent Abstracts of Japan, vol. 096, No. 010, Oct. 31, 1996 corresponding to JP 08 162094 A (Japan Storage Battery Co Ltd). Jun 21, 1996.

Patent Abstracts of Japan, vol. 097, No. 003, Mar. 31, 1997 corresponding to JP 08 293301 A (Wako Denshi KK) Nov. 5, 1996.

Patent Abstracts of Japan, vol. 095, No. 010, Nov. 30, 1995 corresponding to JP 07 169452 A (AT Battery:KK) Jul. 4, 1995.

Patent Abstracts of Japan, vol. 095, No. 007, Aug. 31, 1995 corresponding to JP 07 105933 A (Hitachi Maxell Ltd) Apr. 21, 1995.

*Primary Examiner*—Maria Nuzzolillo
*Assistant Examiner*—Monique Wills
*Attorney, Agent, or Firm*—Sughrue, Mion, Zinn, Macpeak & Seas, PLLC

[57] ABSTRACT

A sealed electrochemical cell (1) fitted with a circuit-breaking terminal (3) which ensures electrical connection between an external contact part (7) of the terminal and one (6) of the positive or negative electrodes of the cell, the external contact part (7) of the terminal being electrically connected to a wall (11) which ensures that the terminal is sealed and which is capable of being deformed under the action of an increase in internal pressure, the wall (11) being connected to said electrode (6) by means (13, 14, 16) which ensure electrical continuity, the continuity being interrupted when an internal pressure P is reached which is greater than a determined value $P_1$, causing the wall to deform and the connection between the wall (11) and a break part (13) to break, the cell being characterized in that said circuit-breaking terminal (3) passes in a sealed manner through a closure lid (2) of the cell, the lid also being fitted separately with a safety capsule (4) which breaks under a pressure $P_2 > P_1$.

8 Claims, 3 Drawing Sheets

SEALED ELECTROCHEMICAL CELL EQUIPPED WITH A CIRCUIT-BREAKING TERMINAL

The present invention relates to a sealed electrochemical cell fitted with a circuit-breaking terminal which ensures electrical connection between an external contact part of said terminal and one of the positive or negative electrodes of the cell, said external contact part of the terminal being electrically connected to a conductive wall which ensures that the terminal is sealed and which is capable of being deformed under the action of an increase in internal pressure, said wall being connected to said electrode by means which ensure electrical continuity, said electrical continuity being interrupted when an internal pressure P is reached which is greater than a determined value $P_1$, causing said wall to deform and the connection between the wall and a break part to break.

U.S. Pat. No. 4,943,497 describes such a cell.

That device is particularly useful for Li-Ion storage cells. Such storage cells are generally constituted by: a positive electrode whose active material is a lithium-containing metal oxide, often selected from cobalt, nickel, and manganese oxides, and mixtures thereof; a negative electrode whose active material is a carbon-containing material selected from natural and artificial graphites, amorphous carbons and cokes, and mixtures thereof, which is capable of receiving lithium during charging; and a non-aqueous electrolyte. Such storage cells have the advantage of very high specific energy density, but the end-of-charge cuttoff voltage must be strictly controlled. When the limit is significantly exceeded, secondary reactions may occur following failure of the generally-associated protection and control circuits. Such reactions are generally associated with an increase in pressure and a rise in temperature, and it is advisable to be be able to interrupt the overcharging reaction early enough by interrupting the circuit.

The above-mentioned document therefore describes such an internal circuit-breaker which interrupts the charging current as soon as the internal pressure has increased in abnormal manner. Nevertheless, it is possible that pressure continues to rise and, in order to prevent an explosion, the above-mentioned prior art document provides that the deformable conductive wall, which ensures that the terminal is sealed, includes a weak point so that it breaks if the pressure continues to rise, thus enabling gas to escape outwards, thereby preventing the element from exploding.

Thus, the deformable wall therefore performs two distinct functions: 1) it ensures that the electrical circuit is interrupted in the event of a dangerous rise in pressure, and 2) it ensures that the gas escapes, thereby avoiding an explosion, were the pressure to continue to rise.

Two such functions are not desirable, since it is very difficult to ensure reliable operation of such a device, and there is a high risk that, during an increase in pressure, the wall, including a weak point will tear before reaching the pressure at which electrical disconnection would take place.

In addition, under such circumstances, pressure can no longer rise in the event of overcharging and electrical disconnection will not occur, thereby resulting in the risk of an explosion.

An object of the present invention is to propose a system which is much more reliable in operation, and which provides an electrochemical cell as defined above, said cell being characterized in that said circuit-breaking terminal passes in sealed manner through a closure lid of the cell, said lid also being fitted separately with a safety capsule which breaks under a pressure $P_2 > P_1$.

Thus, in the invention, the functions are clearly separated, and obtained by two quite distinct members, the deformable conductive wall which ensures that the terminal is sealed, has only one function, that of breaking the electrical connection between the wall and the electrode when it deforms under the effect of an increase in pressure. In addition, the capsule also has only one function, that of tearing under a pressure $P_2 > P_1$. Since the pressures $P_1$ and $P_2$ are clearly distinct, e.g. $P_1$ lying in the range 5 bars to 9 bars, and $P_2$ lying in the range 10 bars to 20 bars, it is easy to determine the limiting mechanical strength of the various members, enabling each of the two functions to be performed at its respective pressure level. Reliability is much greater than in the above-mentioned prior art case.

A significant advantage resulting from the fact that the circuit-breaking terminal is mounted on a closure lid of the cell and does not itself constitute the lid, as is the case in the above-mentioned prior art document, is that, in the present invention, a single standard size can be provided for the circuit-breaking terminal and also for the capsule, both of which may be fitted to any cell regardless of its size. Thus, the required breaking strengths of the materials used need be calculated once only. In the above-mentioned prior art, strength (in the plane parallel to the deformable wall) needs to be calculated specifically for each distinct size of cell.

The invention is particularly applicable to prismatic cell elements.

The description of an implementation of the invention is given below with reference to the accompanying drawings, in which.

Figure 1:
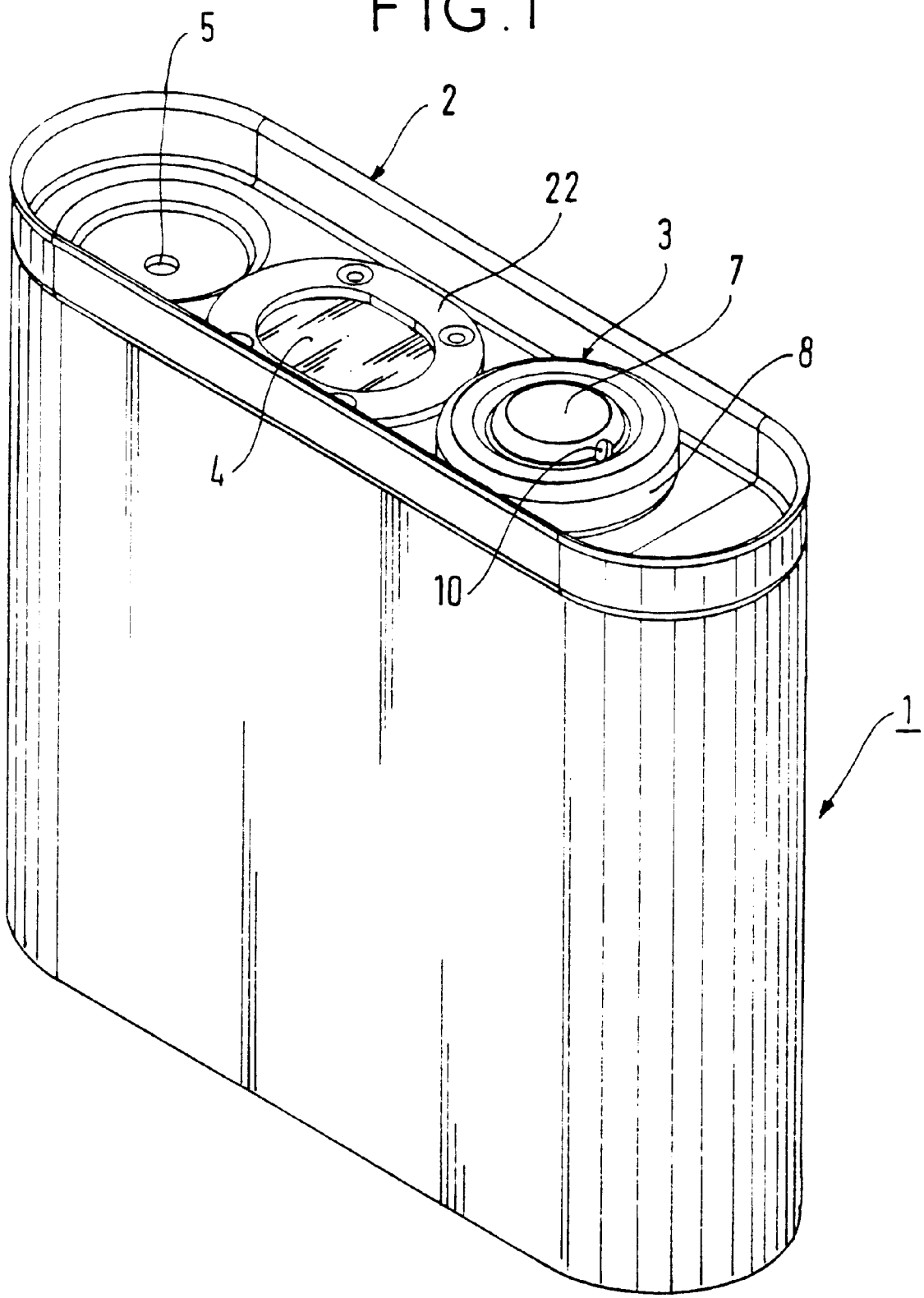
FIG. 1 shows, in perspective, an electrochemical cell of the invention.

With reference to FIG. 1, there can be seen an electrochemical cell 1 of the lithium-ion type, for example, including a closure lid 2 fitted with a circuit-breaking terminal 3, and with a separate safety capsule 4. The lid also includes a location with a hole 5 for filling with electrolyte. Naturally, the hole is subsequently closed.

Figure 2:
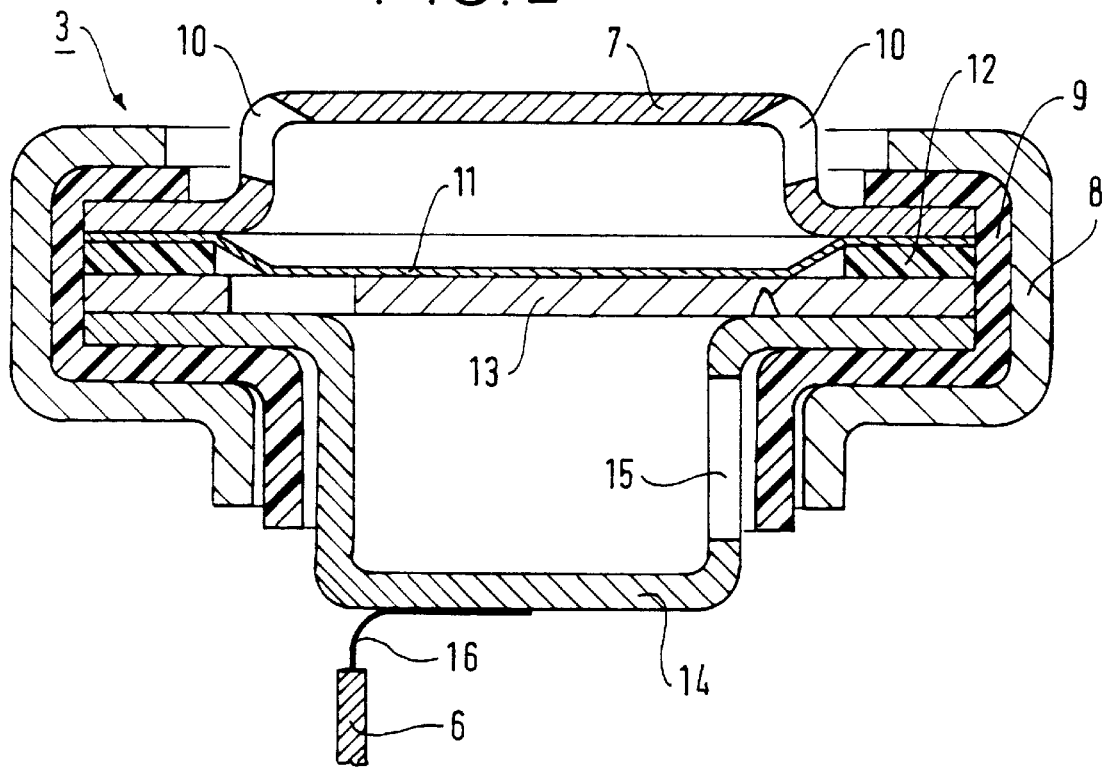
FIG. 2 shows, in isolated cross-section, a circuit-breaking terminal mounted on the lid of the cell of FIG. 1.

FIG. 2 shows the detail of the circuit-breaking terminal 3. The terminal ensures electrical connection between the positive electrode 6 of the cell and an external contact part 7 forming a portion of the terminal. In addition, the terminal also has an internal circuit-breaking function, operating when the internal pressure of the cell reaches an internal pressure P equal to a determined value $P_1$, e.g. lying in the range 5 bars to 9 bars.

The terminal is constituted by an assembly of parts crimped in an external collar 8 with an insulating collar 9 interposed therebetween. The assembly is welded in sealed manner onto the lid 2. In the insulating collar 9, and the external collar 8, the following are thus assembled by crimping the external collar: the dish-shaped external contact part 7 punched with holes 10, a membrane 11, an insulating disk 12, a break disk 13, and a bottom dish 14 punched with holes 15.

The bottom dish 14 is connected to the electrode 6 via a connection 16.

The membrane 11 constitutes a wall which co-operates with the insulating collar 9 to ensure that the terminal is internally sealed. The wall is capable of being deformed under the action of an increase in pressure inside the cell. In normal operation, it also co-operates with the break disk 13, the bottom dish 14, and the connection 16, to provide electrical continuity between the external part 7 and the electrode 6. The membrane 11, in addition to being held against the other parts by being clamped around its periphery by the external collar 8, is also fixed to the center of the break disk 13 via a central spot weld not shown in the figure.

Figure 3:
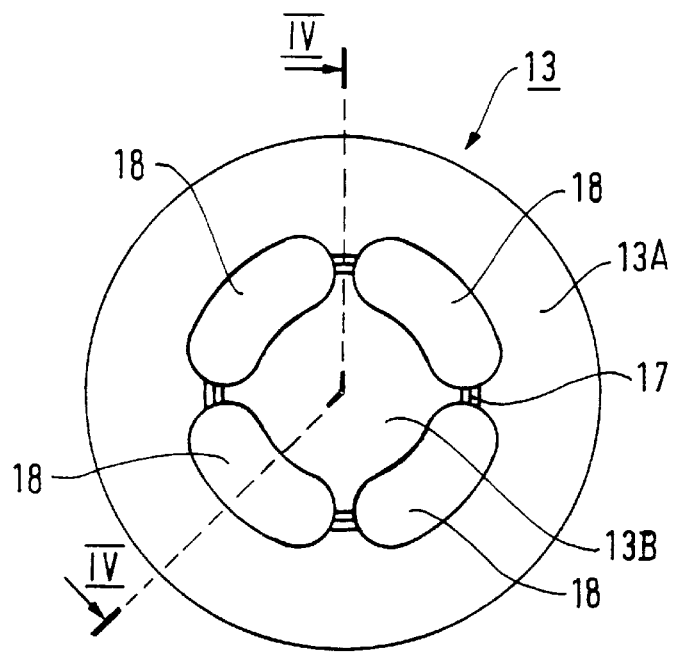
FIG. 3 is a view from above of a part shown in FIG. 2.
Figure 4:
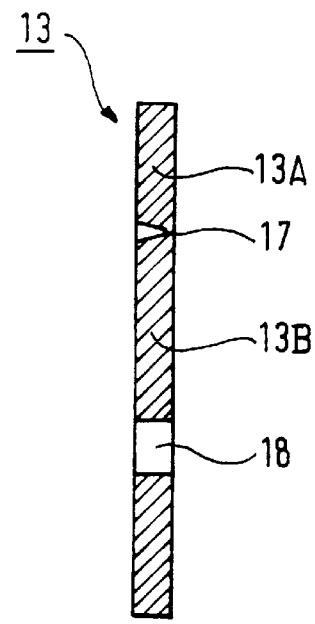
FIG. 4 is a cross-section along IV—IV of FIG. 3.

FIGS. 3 and 4 show the break disk 13 in detail. As can be seen, it comprises a peripheral portion 13A, and a central portion 13B which is connected to the peripheral portion only by four bridges 17 of weak material separated from one another by slots 18. Thus, when the internal pressure P of the cell increases to value $P_1$, the membrane 11 deforms abruptly so as to turn its concave side to face downwards, pulling the central portion 13B of the disk up, and breaking the bridges 17. Electrical continuity between the membrane and the external portion 13A of the break disk is thus broken. The electric circuit is thus permanently interrupted, but sealing is fully conserved, since the deformable membrane 11 is strong.

The nature of the membrane must be chemically compatible with the materials constituting the electrochemical couple, which materials are a function of the polarity of the electrode to which the device of the invention is attached. For example, for a Li-Ion cell, the polarity is generally positive, and in that event the membrane (11), and the parts (13) and (14) are made of a metal that withstands oxidation of the positive active material, which can advantageously be aluminum. The polarity can also be negative, in which event aluminum is not suitable, since it reacts with the lithium contained in the negative electrode to form an alloy. The membrane (11), and the associated parts (13) and (14) are thus advantageously made of nickel-plated steel, nickel, or copper, for example, or any other metal that is stable at lithium potential.

The pressure at which it is desired that the membrane changes over is a function of its characteristics. Thus, an aluminum membrane having a change-over pressure of about 7 bars, has the following characteristics: thickness 0.08 mm, diameter 8.5 mm.

The circuit-breaking terminal 3 is of standard size and can be fitted to the lids of cells of varying sizes. The break disk 13 is designed once for all circuit-breaking terminals, since, before the break occurs the pressure is applied on a constant area of membrane whatever the size of the cell.

Figure 5:
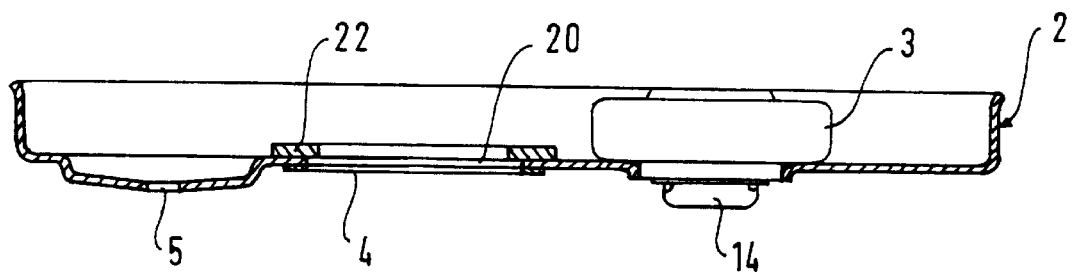
FIG. 5 shows, in isolated cross-section, along V—V of FIG. 6, the lid of the cell of FIG. 1, fitted with a circuit-breaking terminal (outside view), and with the breaking capsule.
Figure 6:
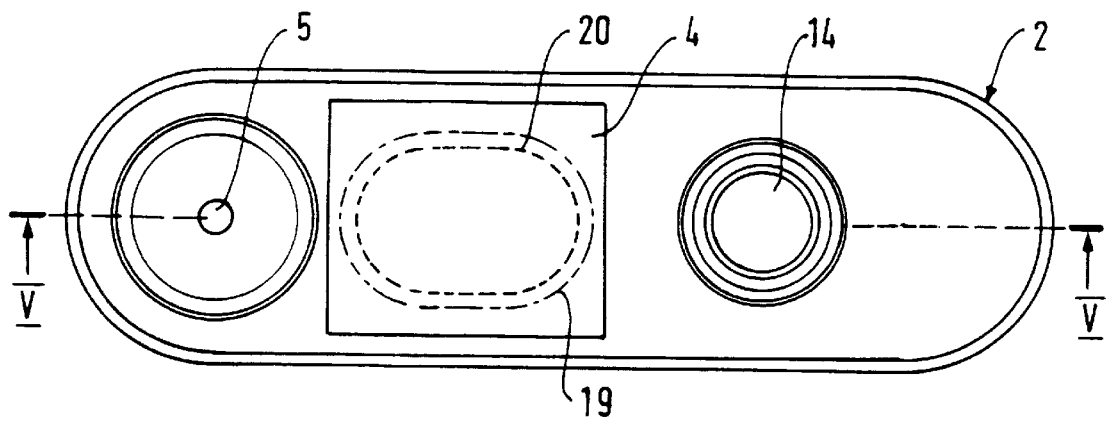
FIG. 6 is a view from below of FIG. 5.

With reference now to FIGS. 5 and 6 separately showing the lid 2 of the cell of FIG. 1, it can be seen that the lid is fitted, in addition to the above-described circuit-breaking terminal 2, with a safety capsule 4.

The safety capsule 4 is constituted by a rectangular sheet (FIG. 6) bonded, along a continuous sealed line 19, to the inside surface of the lid 2 around the perimeter of an opening 20 made in said lid.

If the pressure exceeds a value $P_2$, e.g. greater than 10 bars, and preferably lying in the range 10 bars to 20 bars, the capsule 4 tears, it being understood that the rest of the cell can withstand a much greater pressure, e.g. 40 bars, without exploding.

Thus, firstly, there is no risk of explosion, and secondly if, after the circuit-breaker has functioned, the pressure stops increasing or, in any event, does not reach the value $P_2$ (clearly distinct from $P_1$), then the cell remains sealed with no danger of leakage.

As can be seen in FIG. 1 and FIG. 5, a reinforcement ring 22 is bonded onto the lid 2 over the opening 20.

What is claimed is:

1. A sealed electrochemical cell (1) fitted with a circuit-breaking terminal (3) which ensures electrical connection between an external contact part (7) of said terminal and one (6) of the positive or negative electrodes of the cell, said external contact part (7) of the terminal being electrically connected to a wall (11) which ensures that the terminal is sealed and which is capable of being deformed under the action of an increase in internal pressure, said wall (11) being connected to said electrode (6) by means which ensure electrical continuity, said continuity being interrupted when an internal pressure P is reached which is greater than a determined value $P_1$, causing said wall to deform and the connection between the wall (11) and a break part (13) to break, the cell being characterized in that said circuit-breaking terminal (3) passes in sealed manner through a closure lid (2) of the cell, said lid also being fitted separately with a safety capsule (4) which breaks under a pressure $P_2 > P_1$.

2. A cell according to claim 1, characterized in that said value $P_1$ of the pressure lies in the range 5 bars to 9 bars.

3. A cell according to claim 1, characterized in that the value $P_2$ of the pressure at which the safety capsule (4) breaks is greater than 10 bars.

4. A cell according to claim 1, characterized in that said circuit-breaking terminal (3) is the positive terminal, and in that said wall (11) which ensures sealing and which is capable of being deformed, and said break part (13), and a bottom dish (14) which ensures said electrical continuity between said wall (11) and a connection (16) connected to said electrode (6), are both made of aluminum.

5. A cell according to claim 1, characterized in that said circuit-breaking terminal (3) is the negative terminal, and in that said wall (11) which ensures sealing and which is capable of being deformed, and said break part (13), and a bottom dish (14) which ensures said electrical continuity between said wall (11) and a connection (16) connected to said electrode (6), are made of metal selected from nickel-plated steel, nickel, and copper.

6. A cell according to claim 1, characterized in that it comprises a positive electrode whose active material is a lithium-containing metal oxide, a negative electrode whose active material is a carbon-containing material which is capable of receiving lithium during charging, and a non-aqueous electrolyte.

7. A cell according to claim 6, characterized in that said metal oxide is selected from cobalt, nickel, manganese oxides, and mixtures thereof.

8. A cell according to claim 6, characterized in that said carbon-containing material is selected from natural and artificial graphites, amorphous carbons and cokes, and mixtures thereof.

* * * * *